United States Patent Office 3,214,469
Patented Oct. 26, 1965

3,214,469
DIHYDROXYPHENYLALKANOIC ACID AMIDE DERIVATIVES
Milton Green, Newton Center, Helen P. Husek, Lincoln, and Sidney Kasman, Arlington, Mass., assignors to Polaroid Corporation, Cambridge, Mass., a corporation of Delaware
No Drawing. Filed June 7, 1962, Ser. No. 200,639
6 Claims. (Cl. 260—559)

This invention relates to chemistry and, more particularly to novel chemical compounds which are useful as photographic developing agents.

This application is a continuation-in-part of, and replacement for, our copending application Serial No. 709,001, filed January 15, 1958, now abandoned.

A principal object of this invention is to provide novel chemical compounds.

Another object is to provide syntheses for preparing the novel compounds of this invention.

It is a further object of the present invention to provide novel compounds, products, developer compositions, and processes employing such novel compounds, products and developer compositions for the development of silver halide emulsions.

A still further object of this invention is to provide novel compounds, products and developer compositions useful in diffusion-transfer reversal processes.

Still further objects of this invention will in part be obvious and will in part appear hereinafter.

The invention accordingly comprises the several steps and the relation and order of one or more of such steps with respect to each of the others, and the product posessing the features, properties and the relation of elements which are exemplified in the following detailed disclosure, and the scope of the application of which will be indicated in the claims.

For a fuller understanding of the nature and objects of the invention, reference should be had to the following detailed description.

We have discovered a novel class of chemical compounds, represented by the formulae:

(1)

and (2)

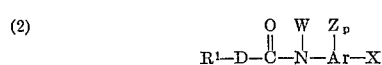

wherein R is a p¹dihydroxyphenyl or an o-dihydroxyphenyl group and alkyl and halogen substituted derivatives thereof; R¹ is a p-bis-acyloxyphenyl or an o-bis-acyloxyphenyl group, and alkyl and halogen substituted derivatives thereof; D is an alkylene radical containing 1–5 carbons; W is hydrogen or an alkyl group, preferably a lower alkyl group such as methyl, ethyl, etc.; $p$ is 0 or a positive integer from 1 to 4, inclusive; Ar is an aryl nucleus, preferably a benzene or naphthalene nucleus; and each Z is an alkyl group, preferably a lower alkyl group such as methyl, ethyl, isopropyl, etc., or substituted alkyl groups, such as trifluoromethyl, a halogen, such as chlorine, an alkoxy group, preferably a lower alkoxy group such as methoxy, ethoxy, etc., an acid group, such as carboxy, a sulfonyl group, a nitro group, an amino group or a substituted amino group, such as alkylamine, acylamine, etc., and X is a hydroxyl, a nitro, a primary amino, a secondary amino, or a tertiary amino group.

The term "acyloxy" is meant to signify the grouping

wherein Y is an aryl, alkyl, aryloxy, or alkoxy group; thus the terms "p-bis-acyloxyphenyl" and "o-bis-acyloxyphenyl" groups may be represented by the formula:

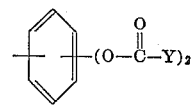

wherein one of said

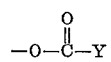

groups is in one of the ortho and para positions with respect to the other of said groups.

The compounds of Formulae 1 and 2 wherein X is an amino or substituted amino group may also be present in the form of acid addition salts such as, for example, the hydrochloride.

In a preferred embodiment of this invention, R is a p-dihydroxyphenyl or R¹ is a p-bis-acyloxyphenyl group; D is an ethylene group; W is a hydrogen radical; $p$ is 1; Ar is a benzene nucleus; X is a tertiary amino group; and Z is a methoxy group.

The preferred compounds of this invention are:

(I)

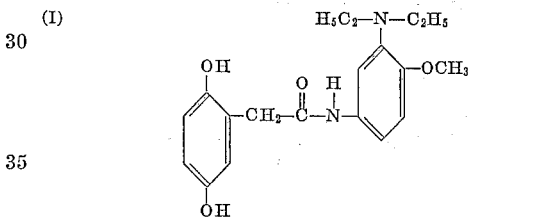

5-homogentisamido-2-methoxy-N,N-diethylaniline (II)

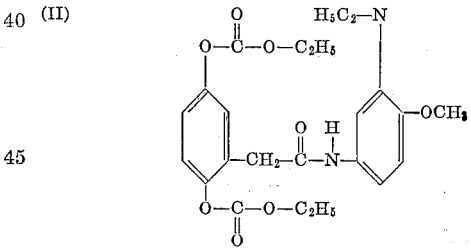

5-(2′,5′-bis-cathyloxyphenylacetamido)-2-methoxy-N,N-Diethylaniline (III)

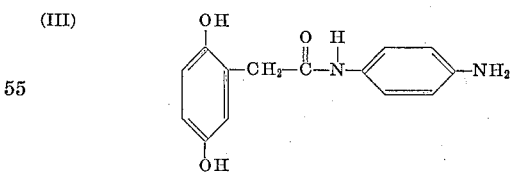

p-Homogentisamido-aniline (IV)

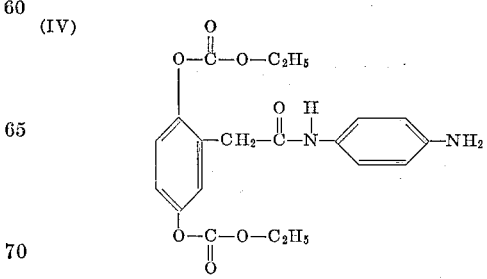

p-(2,5-bis-cathyloxyphenylacetamido)-aniline (V) 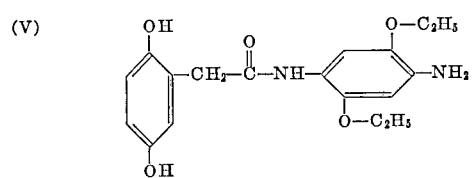

2,5-diethoxy-4-homogentisamido-aniline (VI) 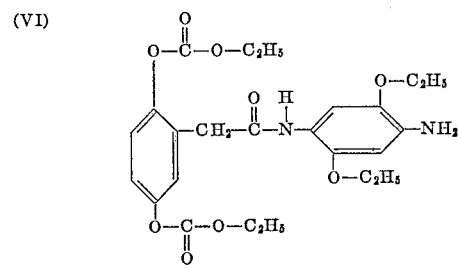

4-(2',5'-bis-cathyloxyphenylacetamido)-2,5-diethoxy-aniline (VII) 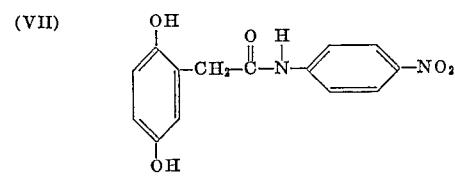

p-Homogentisamido-nitrobenzene (VIII) 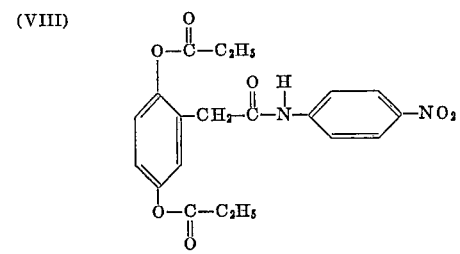

p-(2,5-bis-cathyloxyphenylacetamido)-nitrobenzene (IX) 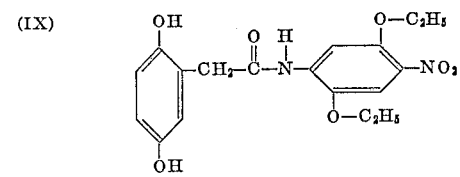

2,5-diethoxy-4-homogentisamido-nitrobenzene (X) 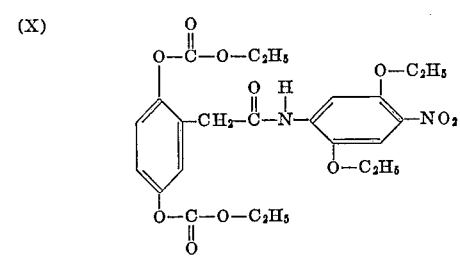

4-(2',5'-bis-cathyloxyphenylacetamido)-2,5-diethoxy-nitrobenzene (XI) 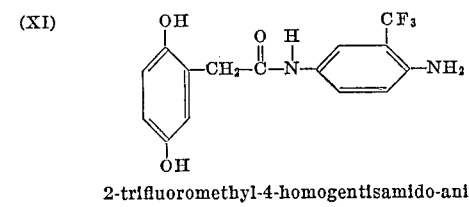

2-trifluoromethyl-4-homogentisamido-aniline (XII) 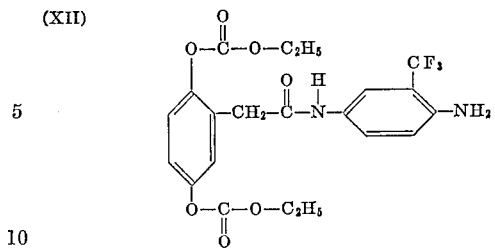

4-(2',5'-bis-cathyloxyphenylacetamido)-2-trifluoromethyl-aniline (XIII) 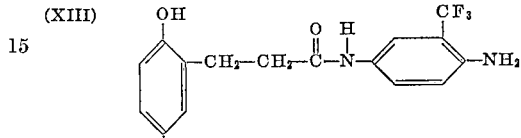

2-trifluoromethyl-4-(2,5-dihydroxyphenylpropionamido)-aniline (XIV) 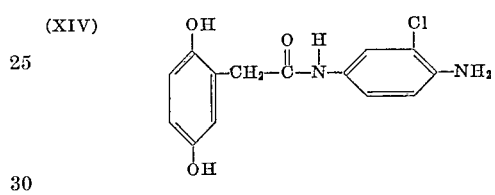

2-chloro-4-homogentisamido-aniline (XV) 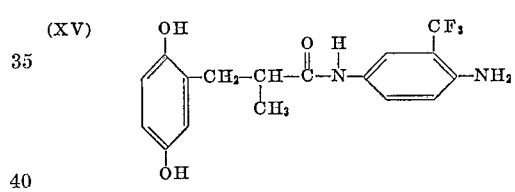

2-trifluoromethyl-4-(2,5-dihydroxyphenylisobutyramido)-aniline (XVI) 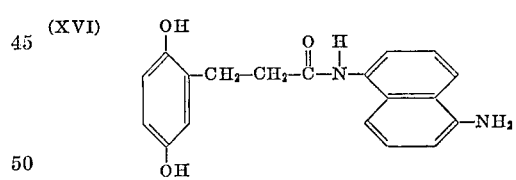

5-(2,5-dihydroxyphenylpropionamido)-1-naphthylamine (XVII) 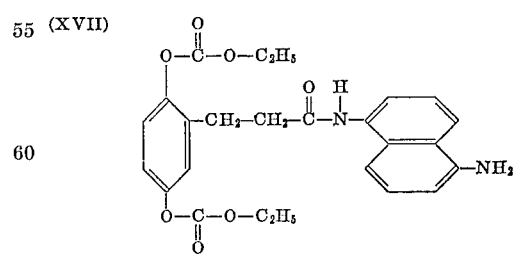

5-(2,5-dicathyloxyphenylpropionamido)-1-naphthylamine (XVIII) 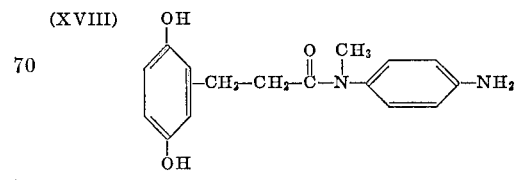

5-(2,5-dihydroxyphenyl-N-methyl-propionamido)-aniline (XIX)
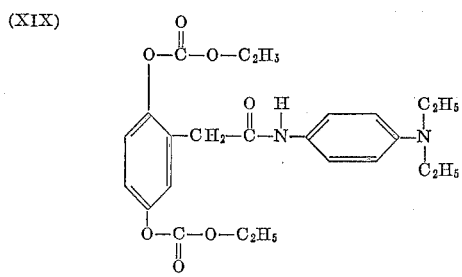
3-(2',5'-bis-cathyloxyphenylacetamido)-N,N-diethylaniline (XX)
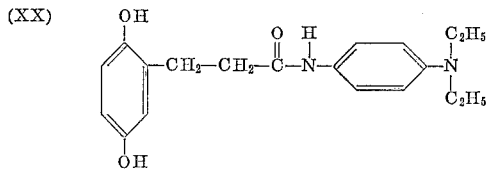
3-(2',5'-dihydroxyphenethylcarboxamido)-N,N-diethylaniline (XXI)
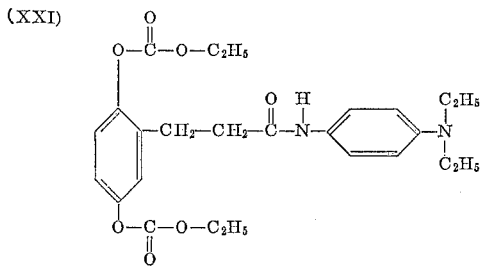
3-(2',5'-bis-cathyloxyphenethylcarboxamido)-N,N-diethylaniline (XXII)
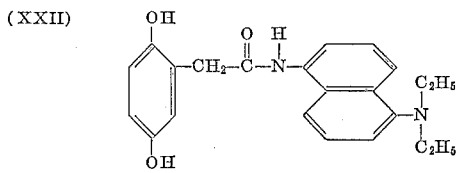
3-homogentisamido-N,N-diethylnaphthylamine (XXIII)
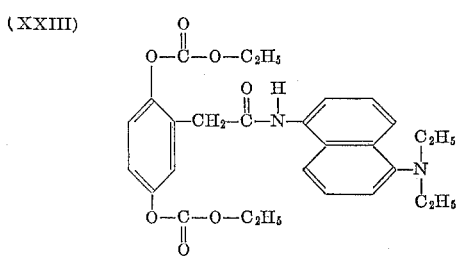
3-(2',5'-bis-cathyloxyphenylacetamido)-N,N-diethylnaphthylamine (XXIV)
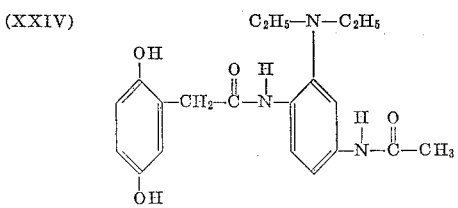
3-acetamido-6-homogentisamido-N,N-diethylaniline (XXV)
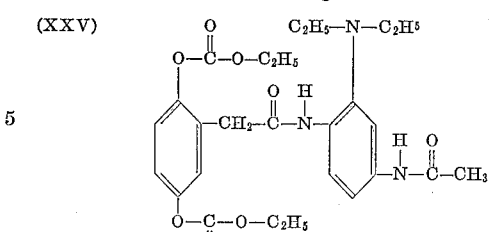
3-acetamido-6-(2',5'-bis-cathyloxyphenylacetamido)-N,N-diethylaniline (XXVI)
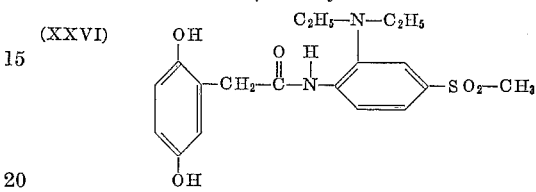
2-homogentisamido-5-methylsulfonyl-N,N-diethylaniline (XXVII)
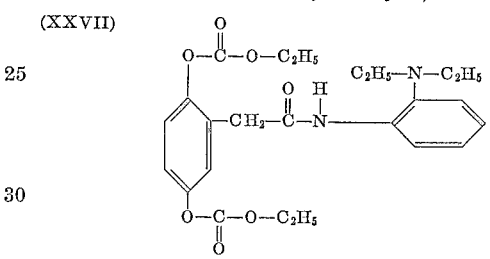
2-(2',5'-bis-cathyloxyphenylacetamido)-5-methylsulfonyl-N,N-diethylaniline As examples of further compounds contemplated within the scope of this invention, mention may be made of:
3-homogentisamido-N,N-diethylaniline
3-acetamido-5-homogentisamido-N,N-diethylaniline
3 - acetamido - 5 - (2',5' - bis - cathyloxyphenylacet - amido)-N,N-diethylaniline
2-acetamido-5-homogentisamido-N,N-diethylaniline
2 - acetamido - 5 - (2',5' - bis - cathyloxyphenylacet - amido)-N,N-diethylaniline
3-homogentisamido-5-methylsulfonyl-N,N-diethylaniline
3 - (2',5' - bis - cathyloxyphenylacetamido) - 5 - methyl - sulfonyl-N,N-diethylaniline One method of preparing the novel compounds of this invention comprises reacting a compound of the formula:

(3)
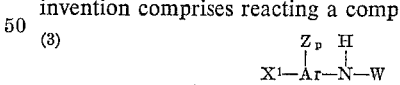

wherein Z, p, W, and Ar have the same significance as noted in Formula 1 and $X^1$ is a hydroxyl, a nitro, a tertiary amino or, where W is hydrogen, a secondary amino group; with a compound of the formula:

(4)

wherein D and $R^1$ have the same significance as in Formula 2 and the halogen is preferably chlorine.

The product of the aforementioned reaction wherein $X^1$ is a nitro group may be directly reduced to yield a compound wherein $X^1$ is a primary amino group.

The hydroxyl-protected derivatives of the ortho- and para-dihydroxyphenyl groups represented by the term $R^1$ in Formula 4 may be prepared by esterification of the ortho- or para-dihydroxyphenyl group. After reaction, and prior to use as a photographic developing agent, the protective groups may be removed by deesterification, such as for example, by hydrolysis in the presence of alkali. However, where the product is desired for utilization as a chemical intermediate for synthesis of certain photographic dyes, as for example in the copending application of Milton Green, Sidney Kasman and Helen P. Husek, Serial No. 75,127, filed December 12, 1960, now abandoned, and the copending application of Milton Green and Helen P. Husek, Serial No. 75,128, filed December 12, 1960, now Patent No. 3,158,595, the removal of the protective groups may preferably take place subsequent to such utilization where reconstitution of the hydroxyl groups is desired.

The invention will be illustrated in greater detail in conjunction with the following specific examples which set out representative preparations of the novel compounds of this invention, which however are not limited to the details therein set forth and are intended to be illustrative only.

Example 1

To prepare 2-methoxy-5-nitro-N,N-diethylaniline, a mixture of 2-methoxy-5-nitro-aniline (84.0 g., 0.5 mole), ethyl iodide (85.0 ml., 164.0 g., 1.05 mole), sodium carbonate (83.5 g., 0.60 mole), 95% alcohol (200 ml.) and water (50 ml.) was refluxed for 42 hours. The mixture was distilled under vacuum to remove the alsohol, diluted with 200 ml. water, and extracted with chloroform. The extract was dried with anhydrous magnesium sulfate, filtered, and distilled. A crude yield of 100.9 g. was obtained, boiling point 153 to 156° C. at 1.45 mm. pressure. This product was treated with 100 ml. acetic anhydride and 3 drops of concentrated sulfuric acid. After 20 minutes, 100 ml. absolute alcohol was added and the solution was boiled free of ethyl acetate and alcohol. The residue was distilled at 1.0 mm. pressure and have 86.3 g. of the desired product, boiling point 155 to 157° C.

Product analysis:

|  | C | H | N |
| --- | --- | --- | --- |
| Calculated_____percent__ | 58.9 | 7.2 | 12.5 |
| Found_____do____ | 58.3 | 6.8 | 12.2 |

To prepare 5-amino-2-methoxy-N,N-diethylaniline, a solution of 2-methoxy-5-nitro-N,N-diethylaniline (56 g., 0.25 mole) in 100 ml. of acetic acid was hydrogenated over a 10% palladium charcoal catalyst until the calculated hydrogen was absorbed. The catalyst was centrifuged out and the solution was distilled at 0.8 to 1.0 mm. pressure. The crude product (31.4 g., 64.8%) distilled over at 134.5 to 137° C. and was initially colorless but rapidly turned brown on exposure to air. This product was redistilled into a receiver containing a trace of hydroquinone to obtain 29.15 g. of the desired product, boiling point 117 to 118° C., at 0.49 mm.

Product analysis:

|  | C | H | N |
| --- | --- | --- | --- |
| Calculated_____percent__ | 68.0 | 9.3 | 14.4 |
| Found_____do____ | 67.5 | 9.8 | 14.5 |

To prepare 5-(2',5'-bis-cathyloxyphenylacetamido)-2-methoxy-N,N-diethylaniline, a solution of 5-amino-2-methoxy-N,N-diethylaniline (9.7 g., 0.05 mole) in 50 ml. dry benzene was added to a mixture of 2,5-bis-cathyloxyphenylacetyl chloride (17.6 g., 0.853 mole) and 100 ml. of dry benzene. The mixture was refluxed one hour with exclusion of moisture and then let stand. A dense oil layer crystallized spontaneously and a white crystalline solid was filtered off, rinsed with dry benzene and vacuum dried. The precipitated product weighed 25.15 g.

Product analysis:

|  | C | H | N |
| --- | --- | --- | --- |
| Calculated_____percent__ | 57.3 | 6.3 | 5.3 |
| Found_____do____ | 58.3 | 6.3 | 5.3 |

To prepare 5-homogentisamido-2-methoxy-N,N-diethylaniline, 2.1 g. of 5-(2',5'-bis-cathyloxyphenylacetamido)-2-methoxy-N,N-diethylaniline (0.004 mole) was suspended in 10 ml. of water and 10 ml. of alcohol. A deaerated solution of potassium hydroxide (0.90 g., 0.016 mole in 10 ml. of water) was added to the suspension. The mixture was heated on a steam bath for a few minutes and the initial oil precipitate redissolved. Acetic acid (1.70 ml., 0.03 mole) was then added to the solution. During the addition of acetic acid, carbon dioxide evolved and an oil precipitate formed which redissolved. The resultant product, without further purification, was found to develop a silver halide latent photographic image.

Example 2

To prepare p-(2,5-bis-cathyloxyphenylacetamido)-nitrobenzene, a mixture of 2,5-bis-cathyloxyphenylacetyl chloride (33 g.) and p-nitro-aniline (13.8 g.) in 200 cc. of o-dichlorobenzene was refluxed one hour and then let stand. On cooling, the desired product precipitated and the mass congealed. The mixture was then diluted with 100 cc. of dichlorobenzene, the solid filtered, the filter cake washed with hexane and the resultant product air-dried. The product weighted 37.5 g. and melted at 165.5 to 166.5° C.

To prepare p-homogentisamido-nitrobenzene, p-(2,5-bis-cathyloxyphenylacetamido)-nitrobenzene may be hydrolyzed in the presence of alkali according to the procedure disclosed in Example 1.

To prepare p-(2,5-bis-cathyloxyphenylacetamido)-aniline hydrochloride, a suspension of p-(2,5-bis-cathyloxyphenylacetamido)-nitrobenzene (15 g.) in 200 cc. of ethanol was hydrogenated under approximately 2 atmospheres of hydrogen in the presence of a palladium barium sulfate catalyst (8 g.). After substantially complete reaction, the mixture was diluted with 100 cc. of benzene, heated to boiling and the catalyst filtered off. 3 cc. of concentrated hydrochloric acid and 100 cc. of diethyl ether were added to the mixture. The desired product precipitated from the mixture and was filtered off. The filter cake was washed with diethyl ether and dried. The product, a white solid, weighed 12 g. and decomposed at 205° C.

Product analysis as $C_{20}H_{23}N_2O_7Cl$:

|  | C | H | N |
| --- | --- | --- | --- |
| Calculated_____percent__ | 54.8 | 5.3 | 6.4 |
| Found_____do____ | 54.6 | 5.4 | 6.6 |

To prepare p-homogentisamido-aniline, p-(2,5-bis-cathyloxyphenylacetamido)-aniline may be hydrolyzed in the presence of alkali according to the procedure disclosed in Example 1.

Example 3

To prepare 4-(2',5'-bis-cathyloxyphenylacetamido)-2,5-diethoxy-nitrobenzene, a mixture of 2,5-bis-cathyloxyphenylacetyl chloride (15 g.) and 2,5-diethoxy-4-nitroaniline (10 g.) in 150 cc. of o-dichlorobenzene was refluxed one hour, cooled, diluted with 1 liter of hexane and refrigerated for 12 hours. The precipitate formed on cooling was filtered and purified by reprecipitation from a 500 cc. charcoal-methanol mixture. The product, yellow fibrous crystals, weighed 12 g. and melted at 121 to 123° C.

To prepare 2,5-diethoxy-4-homogentisamido-nitrobenzene, 4-(2',5'-bis-cathyloxyphenylacetamido)-2,5-diethoxy-nitrobenzene may be hydrolyzed in the presence of alkali according to the procedure disclosed in Example 1.

To prepare 4-(2',5'-bis-cathyloxphenylacetamido)-2,5-diethoxy-aniline hydrochloride, a suspension of 4-(2',5'-bis-cathyloxyphenylacetamido)-2,5-diethoxy-nitrobenzene (14 g.) in 200 cc. of ethanol was hydrogenated under approximately 2 atmospheres of hydrogen in the presence of a 10% palladium charcoal catalyst (5 g.) After substantially complete reaction ,the catalyst was filtered off and the filtrate diluted with an equal volume of benzene. Precipitation occurred upon the addition of 2.3 cc. of concentrated hydrochloric acid. The mixture was diluted with an equal volume of diethyl ether, the precipitate filtered off and the filter cake dried in a vacuum desiccator. The product, a white crystalline solid, weighed 12 g. and decomposed at 209 to 210° C.

Product analysis as $C_{24}H_{31}N_2O_9Cl$:

|  | C | H | N |
|---|---|---|---|
| Calculated_____percent__ | 54.8 | 5.9 | 5.3 |
| Found_____do____ | 55.0 | 6.1 | 5.3 |

To prepare 2,5-diethoxy-4-homogentisamido-aniline, 4-(2',5'-bis-cathyloxyphenylacetamido)-2,5-diethoxy-aniline may be hydrolyzed in the presence of alkali according to the procedure disclosed in Example 1.

*Example 4*

A mixture of 5.26 g. of:

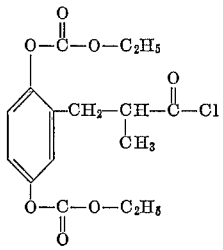

2,5-bis(cathyloxy)-α-methyl-dihydrocinnamoyl chloride (boiling point 180–185° C., at 0.7 mm. Hg) and 3.01 g. of 2-nitro-5-amino-benzotrifluoride in 65 ml. of dry chlorobenzene were heated at reflux for 1.5 hours, after which time it was cooled and diluted with 300 ml. of hexane. The oil which separated was decanted and washed with hexane. The oil was then dissolved in 100 ml. of ethanol and hydrogenated in a Parr shaker with 0.5 g. of 10% palladium barium sulfate catalyst. Hydrogen uptake stopped at 82% of theoretical in less than 1 hour. The solution was filtered directly into 100 ml. of 6 N HCl and the resulting acidic solution was concentrated under reduce pressure to a volume of 150 ml. in the cold. After chilling overnight in a refrigerator, a white crystalline product appeared. The product was collected and washed with a small amount of ice water. The 4-[2',5'-bis-(cathyloxy)-phenyl]-isobutyramido-2-trifluoromethyl-aniline hydrochloride weighed 4.9 g. and melted at 151.5–153° C.

Product Analysis:

|  | C | H | N | Cl |
|---|---|---|---|---|
| Calculated_____percent__ | 51.65 | 4.90 | 5.24 | 6.63 |
| Found_____do____ | 51.78 | 4.93 | 5.16 | 6.91 |

The procedure exemplified in Examples 1 through 4, inclusive, may be modified by the substitution of the appropriate starting materials where it is desired to synthesize further compounds within Formula 1, for example, the specific compounds previously enumerated.

As previously mentioned, the novel dihydroxyphenyl compounds of this invention are useful silver halide photographic developing agents in both conventional black-and-white development and diffusion transfer processes, both dye and silver, and are especially useful in such photographic processes wherein it is desired to eliminate or minimize the need for washing or stabilizing operations in liquid baths subsequent to the formation of the silver print. Examples of such processes are disclosed in U.S. Patent No. 2,647,056, issued to Edwin H. Land on July 28, 1953.

By way of example, a developer composition suitable for use in conventional photographic processes, such as tray or tank development of conventional photosensitive films, plates or papers, may comprise an aqueous solution of approximately:

| | Percent |
|---|---|
| 5-homogentisamido-2-methoxy-N,N-diethylaniline | 2 |
| Sodium hydroxide | 1 |
| Sodium sulfite | 2 |
| Potassium bromide | 0.05 |

The addition of a silver halide solvent, such as sodium thiosulfate, and a viscosity increasing agent, such as sodium carboxymethyl cellulose, to the aforementioned photographic developer composition according to the procedure disclosed in the previously mentioned patent to Edwin H. Land, No. 2,647,056, provides a photographic developer composition useful in diffusion transfer processess.

It will be apparent that the relative proportions of the novel agents of the developer composition set forth above may be varied to suit the requirements of the operator; thus, it is within the scope of this invention to modify the above developing composition by the substitution of preservatives, alkalies, silver halide solvents, etc., other than those specifically mentioned. When desirable, it is also contemplated to include in the developing composition common components such as restrainers, accelerators, etc.

Particularly useful developer compositions may also contain an auxiliary or accelerating developer such as metol, benzylaminophenol or a 3-pyrazolidone, such as 1-phenyl-3-pyrazolidone. The preferred auxiliary developer is 1-phenyl-3-pyrazolidone.

As previously noted, the novel compounds of this invention wherein X is a substituted amino group may be in the form of an acid addition salt. Thus the salt of secondary or tertiary amino developing agents of this invention may be employed where the developing agent is to be incorporated in, on or behind, the silver halide emulsion or where one desires to prepare a dry developer composition, the solvent being added to the dry composition prior to use.

Since certain changes may be made in the above products and processes without departing from the scope of the invention herein involved, it is intended that all matter contained in the above description shall be interpreted as illustrative and not in a limiting sense.

What is claimed is:

1. A compound of the formula:

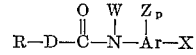

wherein R is selected from the group consisting of p-dihydroxyphenyl and o-dihydroxyphenyl; D is an alkylene radical containing 1 to 5 carbons, inclusive; W is selected from the group consisting of hydrogen and lower alkyl; p is from 0 to 4, inclusive; Ar is an aromatic ring selected from the group consisting of a benzene ring and a naphthalene ring; each Z is selected from the group consisting of lower alkyl, lower alkoxy, chloro, nitro, methylsulfonyl, acetamido, trifluoromethyl, and amino; and X is selected from the group consisting of nitro, amino, and lower alkylamino.

2. 5-homogentisamido-2-methoxy-N,N-diethylaniline.

3. p-Homogentisamido-aniline.
4. 2,5-diethoxy-4-homogentisamido-aniline.
5. 2-trifluoromethyl-4-homogentisamido-aniline.
6. 2-trifluoromethyl-4-(2,5-dihydroxyphenyl - isobutyramido)-aniline.

References Cited by the Examiner

UNITED STATES PATENTS 2,117,260  5/38  Stuart _____ 260—559

FOREIGN PATENTS 818,299  8/59  Great Britain.
828,695  2/60  Great Britain.

OTHER REFERENCES

Groggings: "Unit Processes in Organic Synthesis," 1962 ed., pp. 85–87, 664–5.

WALTER A. MODANCE, *Primary Examiner.*

LEON ZITVER, NICHOLAS S. RIZZO, *Examiners.*